(12) United States Patent
Scriba

(10) Patent No.: US 9,685,147 B2
(45) Date of Patent: Jun. 20, 2017

(54) METHOD AND DEVICE FOR DETECTING A VELOCITY OF AN ACTUATION OF A DEFLECTABLE TRANSMITTER COMPONENT OR KEY OF AN ELECTRONIC MUSICAL INSTRUMENT

(71) Applicant: Jürgen Scriba, Elmshorn (DE)

(72) Inventor: Jürgen Scriba, Elmshorn (DE)

( * ) Notice: Subject to any disclaimer, the term of this patent is extended or adjusted under 35 U.S.C. 154(b) by 0 days.

(21) Appl. No.: 14/776,195

(22) PCT Filed: Mar. 12, 2014

(86) PCT No.: PCT/DE2014/000127
§ 371 (c)(1),
(2) Date: Dec. 15, 2015

(87) PCT Pub. No.: WO2014/139507
PCT Pub. Date: Sep. 18, 2014

(65) Prior Publication Data
US 2016/0148608 A1 May 26, 2016

(30) Foreign Application Priority Data
Mar. 14, 2013 (DE) .......... 10 2013 004 468

(51) Int. Cl.
*G01P 3/00* (2006.01)
*G10H 1/02* (2006.01)
(Continued)

(52) U.S. Cl.
CPC ............. *G10H 1/34* (2013.01); *A63H 33/26* (2013.01); *G10H 1/0066* (2013.01); *G01P 3/50* (2013.01);
(Continued)

(58) Field of Classification Search
CPC .. G10H 1/34; G10H 1/0066; G10H 2220/271; G10H 2220/281; G10H 2230/055; A63H 33/26
(Continued)

(56) References Cited

U.S. PATENT DOCUMENTS

| | | | |
|---|---|---|---|
| 5,619,005 | A | 4/1997 | Shibukawa et al. |
| 2006/0201313 | A1 | 9/2006 | Sasaki et al. |
| 2008/0245216 | A1 | 10/2008 | Kojima et al. |

FOREIGN PATENT DOCUMENTS

| | | |
|---|---|---|
| DE | 10058321 | 6/2001 |
| DE | 102004015056 | 10/2005 |

(Continued)

OTHER PUBLICATIONS

International Search Report dated Jun. 13, 2014 issued on PCT Patent Application No. PCT/DE2014/000127 dated Mar. 12, 2014, European Patent Office.
(Continued)

*Primary Examiner* — Jeffrey Donels
(74) *Attorney, Agent, or Firm* — Mannava & Kang, P.C.; Arash Behravesh

(57) ABSTRACT

The invention relates to a method for detecting actuation of a deflectable transmitter component, comprising the steps of: recording (20) a measured value (U) corresponding to a deflection of the deflectable transmitter component; comparing (30) the measured value (U) with a predefined threshold value ($U_s$); if a result of the comparison (30) is that a predefined condition has been satisfied (34): storing the measured value (U) as a first measured value ($U_1$); allowing (40) a predefined time difference (Δt) to elapse; recording (50) a second measured value ($U_M$) corresponding to a deflection of the transmitter component; and calculating (60) a value representing the actuation.

6 Claims, 2 Drawing Sheets

(51) Int. Cl.
    *G10H 7/00*     (2006.01)
    *G10H 1/34*     (2006.01)
    *A63H 33/26*    (2006.01)
    *G10H 1/00*     (2006.01)
    *G01P 3/50*     (2006.01)

(52) U.S. Cl.
    CPC . *G10H 2220/271* (2013.01); *G10H 2220/281* (2013.01); *G10H 2230/055* (2013.01)

(58) Field of Classification Search
    USPC .................................................. 84/626, 726
    See application file for complete search history.

(56) References Cited

FOREIGN PATENT DOCUMENTS

| | | | |
|---|---|---|---|
| DE | 102005017758 B3 | 8/2006 | |
| JP | 2004157345 A | 6/2004 | |

OTHER PUBLICATIONS

SEW Eurodrive, CCU "Universal Module, Application Module", May 2015, pp. 68, Bruchsal, Germany. download.sew-eurodrive.com/download/pdf/17061210.pdf.

METHOD AND DEVICE FOR DETECTING A VELOCITY OF AN ACTUATION OF A DEFLECTABLE TRANSMITTER COMPONENT OR KEY OF AN ELECTRONIC MUSICAL INSTRUMENT

CLAIM FOR PRIORITY

The present application is a national stage filing under 35 U.S.C. §371 of PCT application number PCT/DE2014/000127, having an international filing date of Mar. 12, 2014, which claims priority to German patent application number 10 2013 004 468.5, having a filing date of Mar. 14, 2013, the disclosures of which are hereby incorporated by reference in their entireties.

FIELD OF THE INVENTION

The invention relates generally to a method and a device for detecting an actuation of a deflectable transmitter component, in particular of a key of an electronic musical instrument.

BACKGROUND ART

A claviature having keyboard expression (action dynamics; Anschlagdynamik) is known. Such a claviature serves not only sending, to an electronic musical instrument, just ON-/OFF-information, that is triggered by pressing or releasing a key, but also providing information concerning a force or velocity exerted when pressing the key. Appropriate samplers (generators of sound; Klangerzeuger) use this information to vary a sound volume, but also a tone color (Klangcharakter) of the generated tone, dependent on the strength with which the key was actuated. Typically, in this manner, a sound of a piano is being simulated, in which tones being actuated in a strong manner are louder and have a more brilliant sound, because of the richer harmonics of the string being actuated more strongly. Thus, there is a need, also in the field of electronically playable musical instruments, to detect a dynamics of an actuation of a key.

Several different approaches are known, to derive information about a strength of an actuation with the help of sensors, that acquire a measurement signal, that is dependent on a manner of moving a key, for example by arrangements, wherein a magnet is moved within a coil, or the inductivity of a coil is modified by moving parts of a core, e.g. a ferrite core. It is also possible to use electrical sensors. In many of the known arrangements, the voltages measured in the described manner influence directly or indirectly the sampling.

These known methods require an involved implementation or are limited to specific genres due to limited possibilities of a generation of sound. Generally established are claviatures, in which the strength of an actuation is being output in an abstract parameter, the influence of which on the sound, in particular in the field of electronic instruments without any natural counterpart, can be used in most different kinds.

A standard for transmitting such information is the parameter "Velocity" within the MIDI data protocol. This value, usually being coded having a resolution of 7 bits, in the value interval of 0 to 127, maps slow key actuations to low number values, high velocities to high number values.

Known electronic keyboards acquire this value by measuring a time that was necessary for moving the key along a predetermined distance.

For this, in the easiest case, the key is provided with two switching contacts S1, S2, of which S1 is actuated at a position P1, after the key has been moved a small distance, starting from the rest position, and S2 is actuated at a position P2, when the key has been moved through a distance Δs.

A connected electronic monitors the keys and registrates an actuation of the switch S1. As soon as the actuation of the switch S1 has been detected, a time measurement commences. As soon as the switch S2 is actuated because of the proceeding movement of the key, the time measurement is stopped. Based on the elapsed time, the above mentioned velocity parameter is calculated and a tone request is generated, e.g., by sending the MIDI command "Note-On". A short time Δt is translated into a high velocity value, a longer time Δt is translated into a smaller velocity value.

Alternatively or additionally to mechanical switches, optical sensors are arranged for detecting the different positions of the key. Also magnetically influenced switching elements, arranged in a stacked manner, are known. In principle, it is also possible to gain the information, as to when the key has moved from position P1 to position P2, using a linearly working sensor system.

Several approaches are known, to detect a larger number of positions of the key and, thus, achieving even finer differentiated time measurements for mapping the keyboard expression, by using refined arrangements of several optical sensors, e.g. by using fiber optical systems or mirror arrangements.

However, as a matter of principle, all these approaches suffer from a drawback: In order to enable a meaningful time measurement during the key movement, the key has to move a considerable distance, before a tone request can be triggered. In conventional systems, this distance is of circa 2 mm. If the distance is added, that the key has to travel, in order to reliably detect a deflection from the rest position, the so-called false touch (Leerreise, idle distance), triggering of a tone happens typically after an actuation of the key of about 4 mm.

Principally, claviatures having a velocity evaluation require a larger false touch distance than claviatures that do not exhibit keyboard expression. In particular in the case of organs, this is considered negative in regard of the playing properties, because known mechanical organ claviatures react already after a false touch distance of 1.5 to 2.0 mm, which is required by organists for playing rapidly.

For example, the document De 100 58 321 A1 is known. Disclosed herein are a contact control device and a contact control method, that can be applied to an electronic instrument. Herein, a key arrangement is disclosed, that generates contact data, that indicate a strength of a force of a key pressure. For achieving this, a key scanning arrangement is described, that measures a time, until a second key switch S2 is switched ON, subsequently to a first key switch S1 being switched ON upon an actuation of the key.

Thus, it is a task of the present invention, to provide an improved method and an improved device for detecting an actuation of a deflectable transmitter component, in particular in an electronically controllable musical instrument, in particular in an electronically controllable organ.

DISCLOSURE OF THE INVENTION

This task is solved by a method for detecting an actuation of a deflectable transmitter component according claim 1, and a device for detecting an actuation of a deflectable transmitter component, and a computer program and an electronic storage medium in the further independent claims. Further advantageous embodiments of the invention are described in the dependent claims.

According to a first aspect, a method for detecting an actuation of a deflectable transmitter component is provided, comprising the steps of: recording a measured value corresponding to a deflection of the deflectable transmitter component; comparing the measured value with a predetermined threshold value; if a result of the step of comparing is, that a predetermined condition has been satisfied: storing said measured value as a first measured value; allowing a predetermined time difference to elapse; recording a second measured value corresponding to a deflection of the deflectable transmitter component; and calculating a value representing the actuation.

One idea of the above method is, that an actuation or a dynamics of an actuation of a deflectable transmitter component is, essentially free of delay, detected, evaluated, and converted into a control signal, by continually, within a given timely difference, recording the actual position of the transmitter component. Free of delay shall in particular mean, that a person actuating the deflectable transmitter component does not perceive a delay. Dynamics of an actuation shall in particular mean a time dependence of the actuation of the deflectable transmitter component, for example a velocity of the actuation.

According to one embodiment, the deflectable transmitter component can be a key of an electronically playable musical instrument and/or a component of an electronic toy. In the case the deflectable transmitter component is a key of an electronically playable musical instrument, in particular, e.g., at an electronic claviature, in particular at an electronically controllable organ, it is provided, that the evaluation of the dynamics of actuation or the keyboard expression enables a triggering of a tone that is perceived to be independent from the position of the key. In other words, the evaluation of the keyboard expression, as for example by generating the velocity data, does not negatively influence the position of the key that triggers the tone, in particular in a non-perceivable manner. In the case, that the deflectable transmitter component is a key of a component of an electronic toy, it is possible, e.g. for implementing a high-speed electronic game that is full of action and/or intensitive in reaction, to generate game instructions that enable an almost realistic feeling in the game, to a player.

Further, the method can be provided to output a value representing the transmitter component, e.g. for a tone, and a value representing the actuation, as a tupel of values. A plurality of transmitter components may be provided, the actuation of which, in particular the actuation dynamics of which, is to be detected, so that an actually selected actuated transmitter component and the actuation of which is identifiable. The result of this identification is being output along with a value representing the dynamics of actuation as tupel of values.

In other words, the tupel of values may comprise the value representing the actuation and an identifier identifying the deflectable transmitter component.

In particular, the tupel of value may be a MIDI tupel of values of channel, note and velocity. Thus, it can be enabled that the method in combination with the MIDI standard can send multiple values to an electronically playable musical instrument.

In particular, the measured values may be voltage values, in particular amplified voltage values, of a magnetic field sensor, and the deflection corresponds to a distance between a magnet and the magnetic field sensor, wherein the magnet is attached to the deflectable transmitter component and the magnetic field sensor is stationarily attached to a bearing component that bears the transmitter component, or, the magnet is stationarily attached to the bearing component, bearing the sensor component and the magnetic field sensor is attached to the deflectable transmitter component.

Thus, a relative distance or a relative dynamics of actuation of the deflectable transmitter component may be detected by means of a magnet and a magnet sensor.

According to one embodiment, the step of comparing the measured value with the predetermined threshold value may be determining of the measured value falling below or exceeding the predetermined threshold value. In other words, it is considered, that a measured value is recorded continuously and is compared with a predetermined threshold. In one embodiment it is considered, that the step of comparing comprises, that the case, that the measured value is below the predetermined threshold, is regarded to fulfill a predetermined condition. In an alternative embodiment it is considered, that a condition is regarded to be fulfilled, when the continuously recorded measured value is above the predetermined threshold.

In the case, the predetermined threshold is reached and/or exceeded or fallen below, it can be provided for, that afterwards an elapse of a predetermined time difference is allowed for, before a next measured value is recorded and evaluated. The predetermined time difference can be less than 50 ms, preferentially less than 30 ms, further preferred less than 25 ms, further preferred less than 10 ms, further preferred less than 5 ms. The time difference is, in other words, sufficient long, in order to allow a detectable movement of the transmitter component, and sufficiently short, in order to be essentially not perceivable for a human.

In other words, the method set forth can comprise a first method step with a location-dependent triggering of a first process step, i.e. storing the just recently recorded first measured value, and, a second process step, i.e. recording and storing of a second measured value.

By means of the shift between a location-predetermined and a time-predetermined measurement of the deflection of a transmitter component, in a surprising way, an almost delayless, at least in measures of a perceivability by a human, electronic detection of a dynamics of an actuation is provided.

This method is noticeable in an embodiment in that, even when a key is only slightly actuated, a reaction is definitely triggered, e.g., a tone is triggered. Method and devices of the state of the art having location-predetermined detection positions P1 and P2 would at such actuation of the key, when the actuation of the key is stopped before reaching the location-predetermined position P2, not trigger any tone.

According to a further aspect, a device for detecting an actuation of a deflectable transmitter component is provided, the device being arranged to: record a measured value corresponding to a deflection of the deflectable transmitter component; compare the measured value with a predetermined threshold value; if a result of the step of comparing is, that a predetermined condition has been satisfied: to store said measured value as a first measured value; to allow a predetermined time difference to elapse; to record a second measured value corresponding to a deflection of the deflectable transmitter component; and to calculate a value representing the actuation.

This device can be a claviature of an electronic playable instrument, as for example an electronically playable mechanical organ having a wind supply (Gebläse), an electronic organ, an E-piano and things like that.

Further, the device can be a component of an electronic game, e.g. a game console.

According to a further aspect, a computer program is provided that is arranged to execute all steps of a method as described above.

According to a further aspect, an electronic storage medium is suggested, on which a computer program as described before is stored.

BRIEF DESCRIPTION OF THE DRAWINGS

Preferred embodiments of the present invention will be explained subsequently with the help of the attached drawings. It shows.

DESCRIPTION OF EMBODIMENTS

Figure 1:
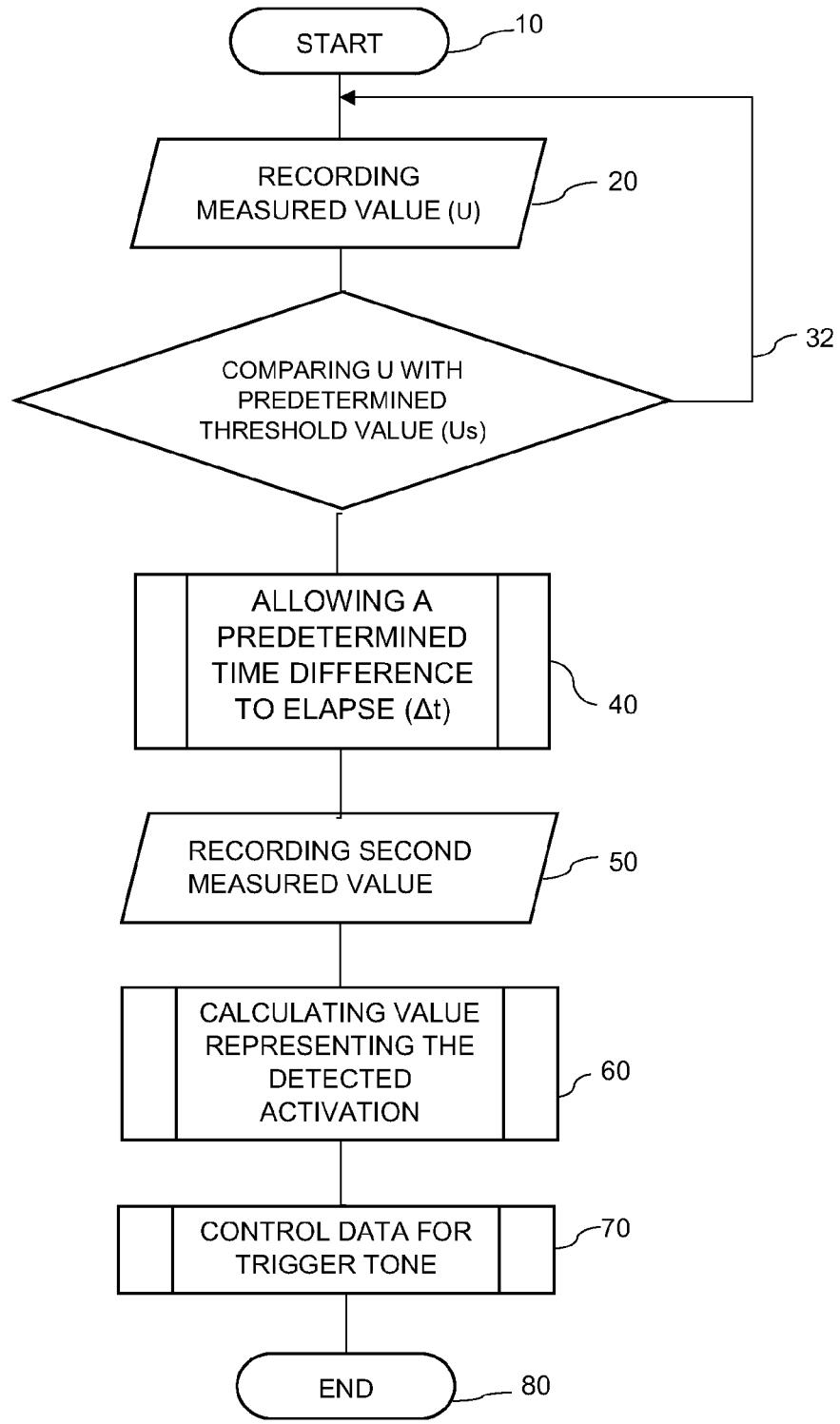
FIG. 1 a flowchart for schematically representing a method for detecting an actuation of a deflectable transmitter component.

FIG. 1 illustrates a method for detecting an actuation of a deflectable transmitter component. The method starts with step 10. In a subsequent step 20, a measured value U is recorded, which corresponds to a deflection of the deflectable transmitter component. This can be, e.g., an actuation of a key of an electronic claviature, in particular for control of a musical instrument, or a transmitter component for an electronic toy.

In a subsequent method step 30 the recorded measured value U is compared to a predetermined threshold $U_S$. An aim of the comparing 30 can be to determine, if a predetermined condition is satisfied. For example, the predetermined condition might be that the measured value falls below a predetermined threshold value $U_S$; alternatively it might be provided for, that the measured value exceeds a predetermined threshold value $U_S$. If in the step 30 it is determined that the condition is not satisfied, the method branches back, in order to record the next measured value, in a further step 20.

If it is determined that the predetermined condition is satisfied, the method is continued via a branch 34, wherein, at first, the measured value U is stored as first measured value $U_1$.

The arriving at the predetermined condition corresponds in case of, e.g., a claviature, that a movement of a false touch distance has been finished, and the player of the instrument now would expect a triggering of a tone, free of delay.

In a subsequent step 40, a predetermined time difference $\Delta t$ is allowed to elapse. The time difference is preferably predetermined in a manner, such, that during it elapses, a movement of the deflectable transmitter component is possible through an operating person and also detectable through the electronics, the time difference itself, however, not perceivable by that person. Preferably this time difference can be smaller than 50 ms, smaller than 20 ms, further preferred smaller than 10 ms, further preferred smaller than or equal to 5 ms.

An electronic circuit executing this method can be arranged such, that in a subsequent step 50 a second measured value $U_M$ can be recorded 50, which corresponds to a deflection, preferably to the actual deflection, of the transmitter component. In a subsequent step 60, a calculation of a value representing the detected actuation can be performed. This value representing the actuation can be output as control data for triggering a tone, in step 70, and can serve as an input for the velocity-parameter of a MIDI interface.

The method ends in step 80, after the desired action, e.g. triggering of a tone or triggering of an action in an electronic game, has been achieved. The skilled person will know that the method can restart at step 10.

It can be provided for, that a tupel of values is being output, that outputs the deflectable transmitter component as well as the value representing the actuation, in the form of a tupel of values, For example in the form of a 3-tupel of values, which might be a MIDI tupel of channel, note and velocity. The measured values can be voltage values of a pair of a magnet and a magnetic field sensor, e.g. a Hall sensor. The measured values can, thus, be voltage values, in particular amplified voltage values, of a magnetic field sensor, and, the deflection can correspond to a distance between a magnet and the magnet sensor, wherein it is attached either the magnet to the deflectable transmitter component and the magnetic field sensor stationarily attached to the bearing component bearing the transmitter component, which might be a claviature frame bearing a claviature, or, the magnet stationarily attached to the bearing component bearing the transmitter component and the magnetic field sensor to the deflectable transmitter component.

A device for detecting an actuation of a deflectable transmitter component can comprise in particular a microprocessor having a memory and a plurality of interfaces, in particular for detection of actuations of the deflectable transmitter component, as well as for output via a MIDI interface. The microprocessor can be provided with a program, that is arranged to execute the method steps in detail described above.

Further, an electronic storage medium can be provided, in which the aforementioned computer program is stored. For example, this might be a USB stick or an internal, in particular non-volatile memory of a microprocessor or an area of a fixed disk of a local computer or a download server. It can be provided for a signal sequence, that represents a computer program as described above.

Figure 2:
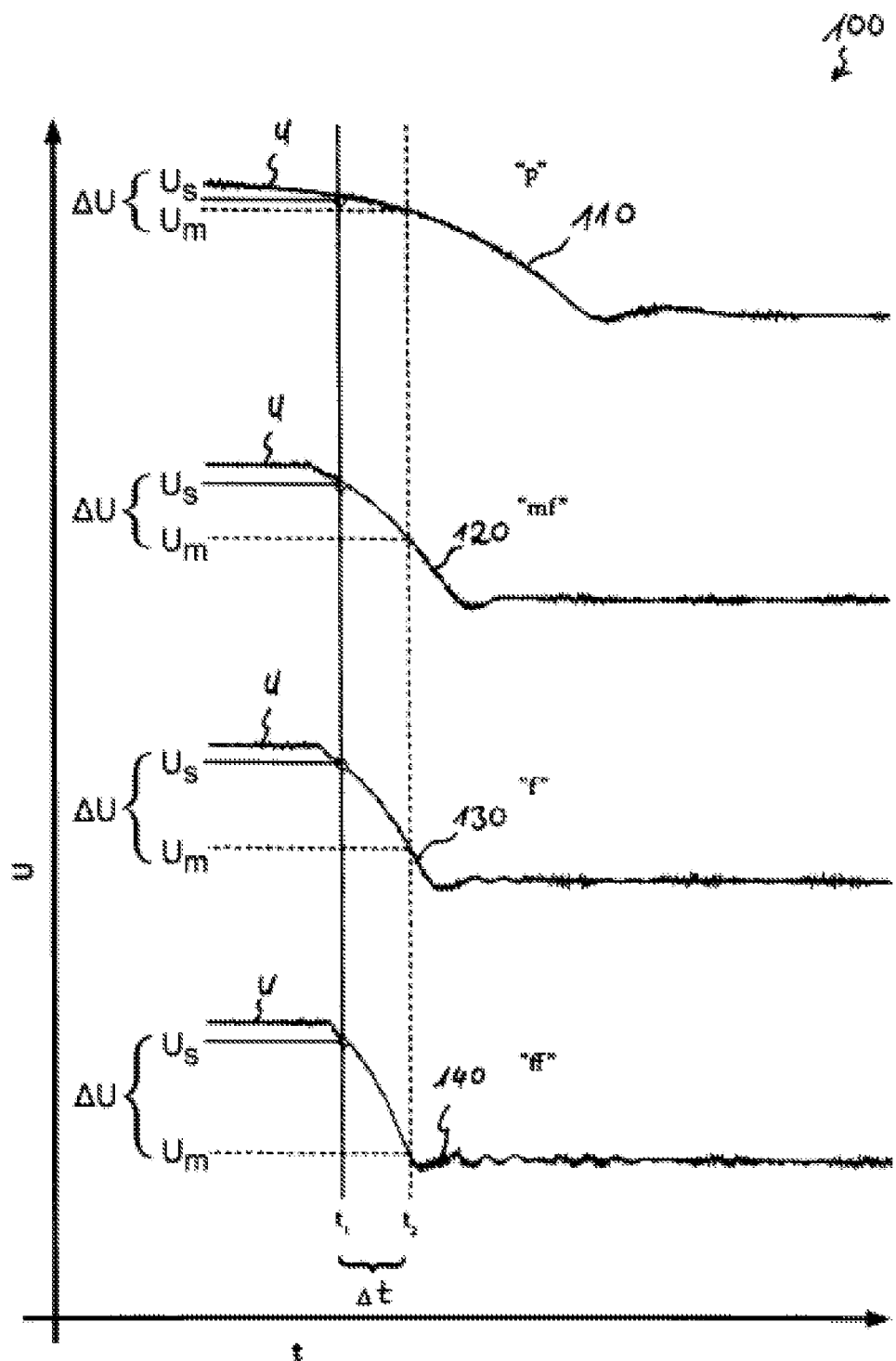
FIG. 2 curves "p", "mf", "f" and "ff", that represent curves of measured curves with different dynamics of actuation.

In FIG. 2, different actuations of a deflectable transmitter component are illustrated, to be precise, a measured value U, recorded in dependence of time.

FIG. 2 shows, thus, typical measured values of such signals, during a transmitter component, e.g. a key of an electronic claviature, is actuated using different strengths of actuation or dynamics of actuation or keyboard expressions. In the embodiment shown herein, a voltage being output from a sensor falls, when the deflectable transmitter component is actuated. The strengths of actuation increases on the four illustrated curves "p", "mf", "f" and "ff" from top to bottom. The designations "p", "mf", "f" and "ff" describe the terms "piano", "mezzo-forte", "forte" and "fortissimo", i.e. very loud, that, in the musical language, describe corresponding strengths of actuations.

The device for detecting an actuation of a deflectable transmitter component, in particular, to be precise, an electronic circuit or a microprocessor circuit, monitors the output voltage of a sensor and recognizes the key to be actuated, when the sensor voltage—in the embodiment described herein—falls below a predetermined threshold value $U_S$. This position of the key in this very moment corresponds to the end of the false touch distance, at which a tone shall be generated. After occurrence of this event, the electronics waits for a predetermined time $\Delta t$, in other words, allows this predetermined time to elapse, and, then, again measures the voltage at the sensor.

The voltage value now measured, the second measured value $U_M$ will thereafter be used for the calculation of a value representing the actuation.

As the measured curves "p", "mf", "f" and "ff" show, the difference $\Delta U=U_S-U_M$ is a measure for the strength of actuation. Because a key that has been actuated only weakly during the measuring time $\Delta t$, or, has only moved slightly, in the time that has been allowed to elapse, only a small $\Delta U$ will result. A strongly actuated key has moved rapidly in the predetermined time, so that a larger $\Delta U$ is expected to result. The measured values can be easily transformed to, e.g., velocity-values.

The measuring time is clearly below 10 ms, typically around 5 ms. Thus, the delay of the tone request lies in the lower range of a reaction time of conventional tone generation systems and is not perceivable to the sense of hearing. The player experiences the generation of the tone always at a position P of the key corresponding to a deflection of the deflectable transmitter component, at which a sensor reaches the predetermined threshold voltage $U_S$. Thus, the kind of playing corresponds exactly to that of a conventional claviature without having keyboard expression.

For the calculation of the value representing an actuation, several predetermined values, additionally to the actually measured second measured value, are necessary. These further values are being determined in a calibration method. This calibration method can comprise recording of a rest voltage (bias voltage), i.e. a measured value in a non-actuated position, a recording of a triggering voltage, i.e. a measured value at a desired triggering point of a tone, as well as a detection of a maximum deflection, i.e. at maximum actuated transmitter component. The value to be output, in particular a velocity, can be determined by normalization in regard of a maximum possible voltage difference, as well as calculating a difference.

It can further be provided for, that before a transmission of the value to be output to a tone generating component of the electronically playable musical instrument, a transformation of the normalized value is done. The transformation can for example be done, in order to match a domain of values of the generated velocity values (0 . . . 127) to an individual way of playing or preference of a user. For example, it can be considered to provide an S-shaped transformation, having flat sections at small and at high detected velocities, so that, e.g., at a high velocity of actuation, a further enhancement thereof does not or hardly enlarge the generated loudness.

LIST OF REFERENCE NUMERALS

10 Start
20 Recording of a first measured value U
30 Comparison of the first measured value U with a threshold value $U_S$ for determining a condition
32 Decision branch, if condition has not occurred
34 Decision branch, if condition has occurred
40 waiting loop allowing a predetermined time difference $\Delta t$ to elapse
50 Detection of a second measured value $U_M$
60 Calculation of a velocity
70 Output of control data for triggering of a tone
80 End of the method
100 Diagrams of measured curves of measured value vs. time
110 Diagram of a measured curve measured value U vs. time at slowly actuated key for generating a quiet tone
120 Diagram of a measured curve measured value U vs. time at slowly actuated key for generating a medium loud tone
130 Diagram of a measured curve measured value U vs. time at slowly actuated key for generating a loud tone
140 Diagram of a measured curve measured value U vs. time at slowly actuated key for generating a very loud tone
p piano
mf mezzoforte
f forte
ff fortissimo
$t_1$ First point of time
$t_2$ Second point of time
U Measured value
$U_1$ First measured value
$U_S$ Threshold value
$U_M$ Second measured value
$\Delta t$ Predetermined difference of time
$\Delta U$ Difference between first and second measured value

The invention claimed is:

1. A method, in an electronically playable musical instrument, for detecting an actuation of a deflectable transmitter component that is a key of the electronically playable musical instrument, comprising the steps of:
   i)—recording, by a microprocessor, a measured value corresponding to a deflection of the deflectable transmitter component;
   ii)—comparing, by a microprocessor, the measured value with a predetermined threshold value;
   iii)—if a result of the step of comparing is that a predetermined condition has been satisfied, executing the following steps:
      iii.1)—storing, in a memory of the microprocessor, said measured value as a first measured value;
      iii.2)—allowing, by the microprocessor, a predetermined time difference to elapse;
      iii.3)—recording, by the microprocessor, a second measured value corresponding to a deflection of the deflectable transmitter component; and
      iii.4)—calculating, by the microprocessor, a value representing the actuation, and
   iv)—if a result of the comparing is that the predetermined condition is not fulfilled, continuing to step i),
   wherein the measured values are amplified voltage values of a magnet sensor, and the deflection corresponds to a distance between a magnet and the magnetic field sensor, wherein the magnet is at least one of (i) attached to the deflectable transmitter component and the magnetic field sensor is stationary attached to a bearing component that bears the transmitter component, and (ii) stationary attached to the bearing component bearing the sensor component and the magnetic field sensor is attached to the deflectable transmitter component.

2. The method according to claim 1, wherein the value representing the deflectable transmitter component and the value representing the actuation is being output as a tupel of values.

3. The method according to claim 2, wherein the tupel of values comprises the value representing the actuation and an identifier identifying the deflectable transmitter component.

4. The method according to claim 3, wherein the tupel of values is a MIDI-tupel of values of channel, note and VELOCITY.

5. The method according to claim 1, wherein the step of comparing the measured value with the predetermined threshold value is determining of the measured value falling below or exceeding the predetermined threshold value.

6. A component in an electronically playable musical instrument for detecting an actuation of a deflectable transmitter component that is a key of the electronically playable musical instrument, the component comprising a microprocessor being arranged to:
- i)—record, by the microprocessor, a measured value corresponding to a deflection of the deflectable transmitter component;
- ii)—compare, by the microprocessor, the measured value with a predetermined threshold value;
- iii)—if a result of the step of comparing is that a predetermined condition has been satisfied, executing, by the microprocessor, the following steps:
    - iii.1)—to store, by the microprocessor, said measured value as a first measured value;
    - iii.2)—to allow, by the microprocessor, a predetermined time difference to elapse;
    - iii.3)—to record, by the microprocessor, a second measured value corresponding to a deflection of the deflectable transmitter component; and
    - iii.4)—to calculate, by the microprocessor, a value representing the actuation and,
- iv)—if a result of the comparing is that the predetermined condition is not fulfilled, continuing to step i), wherein the measured values are amplified voltage values of a magnet sensor, and the deflection corresponds to a distance between a magnet and the magnetic field sensor, wherein the magnet is at least one of (i) attached to the deflectable transmitter component and the magnetic field sensor is stationary attached to a bearing component that bears the transmitter component, and (ii) stationary attached to the bearing component bearing the sensor component and the magnetic field sensor is attached to the deflectable transmitter component.

* * * * *